March 24, 1959 R. O. WINGFIELD 2,878,781
BATH INSTALLATION, IN PARTICULAR FOR BIRDS
Filed July 20, 1956 2 Sheets-Sheet 1
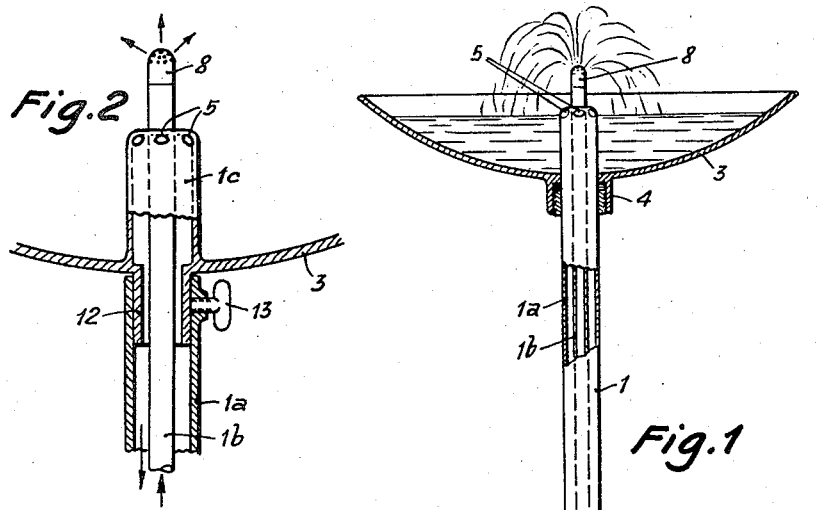
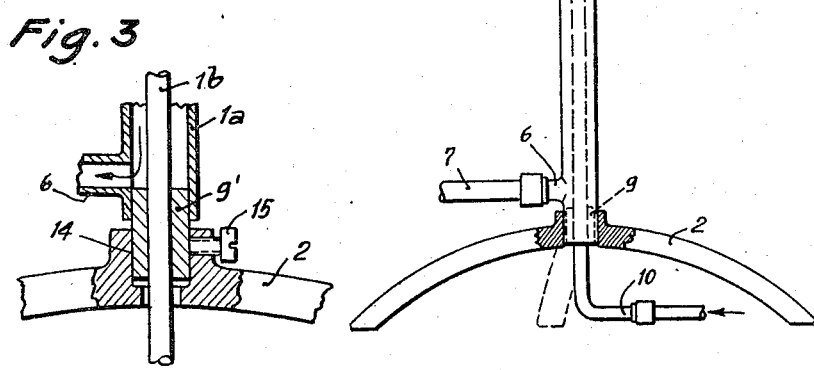
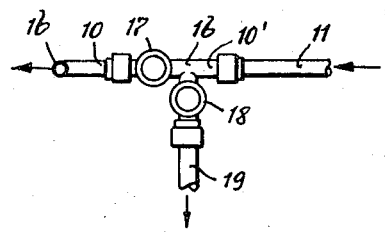
INVENTOR.
Raymond O. Wingfield
BY
Lowry & Rinehart
ATTYS.

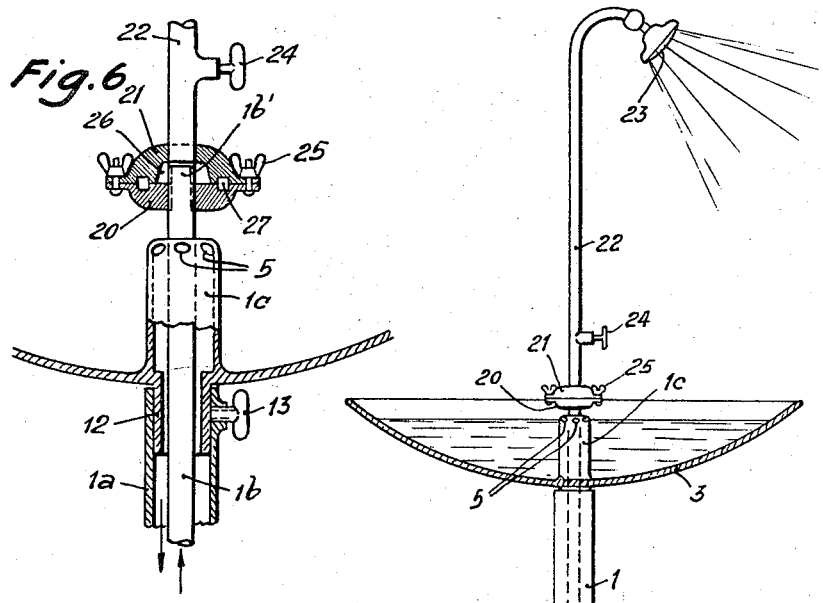

United States Patent Office 2,878,781
Patented Mar. 24, 1959

2,878,781
BATH INSTALLATION, IN PARTICULAR FOR BIRDS

Raymond Otto Wingfield, Mundelein, Ill.

Application July 20, 1956, Serial No. 599,242

1 Claim. (Cl. 119—72)

The known types of bird bath installations, are provided with a flat dish, which is the water container. The present invention is distinguished from these known types of baths by a dish serving as a water container which is arranged on a column, designated as a stand, and contains the water inlet and outlet pipes, where the water inlet orifice above the dish takes the form of a sprinkler.

The column acting as a stand for the dish consists most conveniently of a wide tube, which is the outlet pipe, and a narrower tube, passing axially through the wider tube, and acting as a water inlet pipe, so that there is some play between the wide tube and the narrow tube.

The drawing shows examples of embodiments of the object of the invention, in which:

Fig. 1 is a front view of a first embodiment of the bath installation, partly in section, Fig. 2 is an enlarged sectional view of a modified arrangement for securing the bowl part of the bird bath to a supporting column, Fig. 3 is an enlarged sectional view of a modified arrangement for securing the supporting column of Figs. 1 or 2 to a suitable stand, Fig. 4 discloses a modified arrangement for supplying and exhausting the water to the bird bath from that shown in Fig. 1, Fig. 5 is another embodiment of the bath installation, designed as a refreshing shower for the garden, Fig. 6 is a part section of another modification of the invention, and Fig. 7 is a part of a front view to Fig. 5 on a larger scale and partly in section, after conversion of the installation to form a bird bath.

The installation comprises a stand composed of a column 1 and a foot 2, and carrying on the upper end of the column a flat dish 3. The column consists of an outer tube 1a, and a smaller tube 1b, coaxial with the outer tube, so that there is a space between the wide tube and the narrow tube, and the two tubes together pass through a central opening in the bottom of the dish 3. The dish is sealed by means of a collar 4 centrally depending from the bottom of the dish and surrounding the outer tube 1a with a packing gland set in the collar to frictionally anchor the dish in vertically adjusted position on the outer tube 1a. The outer tube 1a acts as a water outlet pipe, and is equipped for this purpose at its upper end with drain holes 5, and at its lower end, just above the foot, with a lateral outlet connection 6, which is connected to a drain pipe or hose 7. The inner tube 1b acts as the water inlet and it is provided at its end above the upper opening of the outer tube with a sprinkler 8. The lower end of the outer tube is sealed against the inner tube by means of an annular seal 9. The lower end of the inner tube 1b is provided with a union 10 for a water supply hose 11.

The water level in the dish 3 can be raised or lowered, as required, by moving the dish down or up respectively.

It is the purpose of the shower to attract birds and to make it easier for them to take baths.

The variant of Fig. 2, shows another method of fixing the dish 3 to the column. An outlet connection 1c provided above with the drain holes 5 and below with the tapering connection piece 12 is fixed to the central opening of the dish bottom. The connection piece 12 of the dish 3 is pushed on the upper end of the outer tube 1a, and fixed by means of a screw 13.

In the variant according to Fig. 3, the lower end of the column is provided with a connection piece 9', fixed in the lower end of the outer tube 1a, projecting beyond it. The water inlet pipe 1b passes through it. The column is fitted with this connection piece into a hole 14 of the column base 2, and fixed by means of a screw 15.

The detail according to Fig. 4, which is a variant of the one shown in Fig. 1 shows a branch connection 16, provided with a union 10' for the water supply pipe or hose 11, and connected to the union part 10 of the water supply pipe 1b. The cocks 17 and 18 are accommodated in the branch pipes; the cock 17 controls the supply of water to the bird bath, and the cock 18 the water supply pipe 19 to a shower sprinkler, which would be used, for instance, when the installation is used as a sun bath.

Figs. 5 and 6 show an embodiment of the bath installation, which can be employed both as a bird bath and as a refreshing shower when sunbathing. The numbers 1a and 1b denote the stand column, which is provided with the foot 2 and supports a flat dish 3. 1c is the drain connection, fixed in the dish, and 12 the connection piece of the dish, by means of which it is pushed on the tube 1a, and fixed by means of the screw 13. The method of fixing the column in the foot agrees with the one shown in Fig. 1, and the reference numbers designate corresponding parts. The end of the water supply pipe 1b, projecting beyond the drain 1c, is provided with a connection flange 20, through which the pipe 1b passes, so that a connection 1b' projects beyond the flange, which is equipped with an external thread. The flange 21 of a pipe 22 provided with a shower sprinkler 23 is fixed to the flange 20. The shower pipe 22 is provided with a cock 24, and can be detached from the stand by undoing the screws 25, which connect the two flanges 20 and 21 together. After the shower pipe 22 has been removed, a shower sprinkler 8 can be screwed on the projecting threaded pipe connection 1b', as shown in Fig. 7. This shower sprinkler 8 must be removed before mounting the flange 21. This flange is provided with a recess 26 for the pipe connection 1b'. Both flanges are also provided with corresponding annular grooves for a gasket ring 27.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claim.

Having thus described my invention, I claim as new and desire to secure by Letters Patent:

In a bath installation of the type described the combination of a water container, tubular means supporting said water container, conduit means located in said tubular supporting means and extending thereabove for constantly supplying water to said container, and having an outlet at its upper end, the outlet of said conduit means also being normally disposed above the level of the water in the water container, said tubular supporting means also serving as the medium for exhausting the water from the container, upwardly opening drain means located at the upper end of said tubular supporting means above the bottom of the container and below the outlet of said conduit means, said water container being vertically adjustably and sealingly mounted on said tubular supporting means to vary the elevation of the drain means relative to the bottom of the container whereby the level of the water in the container may be regulated and hose means secured to said conduit means.

References Cited in the file of this patent

UNITED STATES PATENTS

| | | |
|---|---|---|
| 586,313 | Jenks | July 13, 1897 |
| 588,772 | Meeres | Aug. 24, 1897 |
| 920,266 | Carothers | May 4, 1909 |
| 1,206,281 | Wood | Nov. 28, 1916 |
| 1,632,842 | Liening | June 21, 1927 |